United States Patent
Hinton et al.

(10) Patent No.: US 7,020,307 B2
(45) Date of Patent: Mar. 28, 2006

(54) ROCK FRAGMENTATION ANALYSIS SYSTEM

(75) Inventors: Eric Herbert Hinton, Lively (CA); Mario Paventi, Sudbury (CA); Peter Saturley, Ottawa (CA); Rodney David Hale, St. John's (CA); George K. I. Mann, St. John's (CA)

(73) Assignee: Inco Limited, Toronto (CA)

( * ) Notice: Subject to any disclaimer, the term of this patent is extended or adjusted under 35 U.S.C. 154(b) by 762 days.

(21) Appl. No.: 10/077,101

(22) Filed: Feb. 15, 2002

(65) Prior Publication Data

US 2003/0156739 A1 Aug. 21, 2003

(51) Int. Cl.
*G06K 9/00* (2006.01)

(52) U.S. Cl. ............. 382/109; 382/181; 382/298; 356/241.1

(58) Field of Classification Search ............. 382/109, 382/181, 298, 274, 281; 356/241.1; 73/152.01; 348/85

See application file for complete search history.

(56) References Cited

U.S. PATENT DOCUMENTS

| | | | | |
|---|---|---|---|---|
| 3,922,206 | A | * | 11/1975 | Thackray ............ 205/120 |
| 4,868,883 | A | * | 9/1989 | Chen ............... 382/109 |
| 4,899,277 | A | * | 2/1990 | Iizuka et al. ........... 702/6 |
| 4,918,739 | A | * | 4/1990 | Lorente et al. ......... 382/109 |
| 5,692,029 | A | * | 11/1997 | Husseiny et al. ........ 378/88 |
| 5,844,800 | A | | 12/1998 | Brandt et al. ...... 364/468.03 |

(Continued)

FOREIGN PATENT DOCUMENTS

EP 0379017 1/1990

OTHER PUBLICATIONS

Nyberg L. et al., "Tecchnological and Methodological Advances in Measurement", vol. 3—pp. 293-302; 1983.

(Continued)

*Primary Examiner*—Barry Choobin
(74) *Attorney, Agent, or Firm*—Edward A. Steen

(57) ABSTRACT

A rock fragmentation analysis system is provided for analyzing blasted rock (or other fragmented particles) to assess quality of a blast for efficient processing of subsequent operations in a mine, a quarry, etc. The system includes a hardware system and an image processing system. The hardware system includes a camera and a lighting system. The lighting system illuminates an area of the mine, quarry, etc. where a load haul dump (LHD) vehicle passes through. Once the LHD vehicle passes through the illuminated area, the camera provides video signals of scoop-top view images of the LHD vehicle to the image processing system via known communication means, such as hard-wired and wireless. The image processing system receives the video signals, captures the scoop-top view images, evaluates the images for subsequent fragmentation analysis, and performs the rock fragmentation analysis. The image processing system performs these functions using several software modules. Two such software modules are the Fragmentation Scanning (FragScan™) and the Fragmentation Analysis (FragAnalysis™) software modules. The FragScan software module scans the video signals until it captures a valid image for analysis by the FragAnalysis software module. Once the FragScan triggers on the image, a raw image and other details corresponding to the captured image are buffered for subsequent rock fragmentation analysis by the FragAnalysis software module. The rock fragmentation analysis is designed to estimate the major diameter of each rock visible in the image. The overall size distribution of the rocks in the image is output by the FragAnalysis software module, and the corresponding input image and the binary blob image, i.e., the processed image, are stored by the image processing system.

24 Claims, 5 Drawing Sheets

U.S. PATENT DOCUMENTS

| | | | | |
|---|---|---|---|---|
| 5,924,575 | A | | 7/1999 | Gigliotti, Jr. et al. ........ 209/580 |
| 6,068,394 | A | * | 5/2000 | Dublin, Jr. .................... 702/43 |
| 6,133,995 | A | * | 10/2000 | Kubota ......................... 356/73 |
| 6,205,687 | B1 | | 3/2001 | Rocke .......................... 37/348 |
| 6,853,448 | B1 | * | 2/2005 | Lenz et al. .............. 356/241.1 |
| 2001/0036294 | A1 | * | 11/2001 | Keskes et al. .............. 382/109 |
| 2002/0047058 | A1 | * | 4/2002 | Verhoff et al. ................. 241/26 |
| 2002/0159617 | A1 | * | 10/2002 | Hu .............................. 382/109 |
| 2003/0156739 | A1 | * | 8/2003 | Hinton et al. ............... 382/109 |
| 2003/0165256 | A1 | * | 9/2003 | Ginkel et al. .............. 382/109 |
| 2003/0179907 | A1 | * | 9/2003 | Bouts et al. ................ 382/109 |
| 2003/0223620 | A1 | * | 12/2003 | Anxionnaz et al. ......... 382/109 |
| 2004/0136047 | A1 | * | 7/2004 | Whitehead et al. ......... 359/296 |
| 2005/0023124 | A1 | * | 2/2005 | Karpetsky et al. ............ 201/25 |

OTHER PUBLICATIONS

Molineros J. et al., "Real-Time Tracking of Multiple Objects Using Fiducials for Augmented Reality", vol. 7, No. 6, pp. 495-506; Dec. 2001.

Pamanen P. et al., "In the Limelight", vol. 7, No. 3, pp. 30-32; 1995.

A. Ord, *Real-Time Image Analysis of Size and Shape Distributions of Rock Fragments*, p. 28-31, The Auslmm Bulletin and Proceedings, vol. 294, No. 1, Feb. 1989 (Nos. 1988 paper—Explo '88).

U. Kemeny, et al, *Analysis of Rock Fragmentation Using Digital Image Processing*, pp. 1144-1160 ASCE Journal of Geotechnical Engineering, vol. 119, No. 7, Jul. 1993.

* cited by examiner

ROCK FRAGMENTATION ANALYSIS SYSTEM

TECHNICAL FIELD

The instant invention relates to fragmentation analysis in general and, more particularly, to a rock fragmentation analysis system for analyzing blasted rock.

BACKGROUND ART

Fragmentation analysis of blasted rock is an important process control activity, particularly in underground mining, for optimizing productivity and cost. Fragmentation analysis includes the estimation of mean particle size and the size distribution related to percent passing in a sieve analysis. With the advancement of camera and imaging technology, the use of photographic based image analysis systems has become a convenient and better alternative to traditional sieving of rock blasts. As a result, mining industries have recently taken an initiative to implement automated image analysis systems for rock fragmentation analysis.

An automated image analysis system has the capacity to monitor the blasted material quality continuously as opposed to only sampling data analysis as in the case of traditional sieving. However, automated image analysis processing requires the images to be taken under controlled lighting conditions to produce more consistent results. Further, commercially available fragmentation software packages are only able to produce fragmentation distribution curves from single digital, print photographs, 35-mm slides or videotapes. For each image, a scale needs to be selected and defined to create a net. Established algorithms are then used on the net to generate a cumulative fragmentation distribution curve. A major drawback of these available software packages is that they can only analyze one image at a time. Determination of fragmentation, however, generally requires analysis of many images.

Accordingly, there is a need for a rock fragmentation system capable of processing multiple digital photographs of fragment material, e.g., rock piles, within a file directory, generating a fragmentation distribution for each digital photograph, and a total fragmentation distribution based on all the digital photographs.

SUMMARY OF THE INVENTION

There is provided a rock fragmentation analysis system for analyzing blasted rock (or other fragmented particles) to assess quality of a blast for efficient processing of subsequent operations in a mine, a quarry, etc. The system includes a hardware system and an image processing system. The hardware system includes a camera and a lighting system. The lighting system illuminates an area of the mine, quarry, etc. where a load haul dump (LHD) vehicle passes through. Once the LHD vehicle passes through the illuminated area, the camera provides video signals of scoop-top view images of the LHD vehicle to the image processing system via known communication means, such as hardwired and wireless. Each LHD rock scoop is tagged using a bar code to identify the rock scoops as they travel through the camera's field of view.

The image processing system is preferably a computer or a server which receives the video signals, captures the scoop-top view images, evaluates the images for subsequent fragmentation analysis, and performs the rock fragmentation analysis. The image processing system performs these functions using several software modules having a set of instructions which are executed by one or more processors of the image processing system. Two such software modules are the Fragmentation Scanning (FragScan™) and the Fragmentation Analysis (FragAnalysis™) software modules.

The FragScan software module scans the video signals until it captures a valid image for analysis by the FragAnalysis software module. Once the FragScan triggers on the image, a raw image and other details corresponding to the captured image are buffered for subsequent analysis by the FragAnalysis software module. FragAnalysis is designed to retrieve saved raw images and perform a complete rock fragmentation analysis of the image. The rock fragmentation analysis is designed to estimate the major diameter of each rock visible in the image. Preferably, the overall size distribution of the rocks in the image is output by the FragAnalysis software module as a text file, and the corresponding input image and the binary blob image, i.e., the processed image, are stored in a compressed format, such as in the jpeg format.

The rock fragmentation analysis system is designed to operate on-line, i.e., while the mine, quarry, etc. is fully functional. Preferably, the two or more processors provided within the image processing system distribute the processing load of the image processing system.

PREFERRED EMBODIMENT OF THE INVENTION

Figure 1:
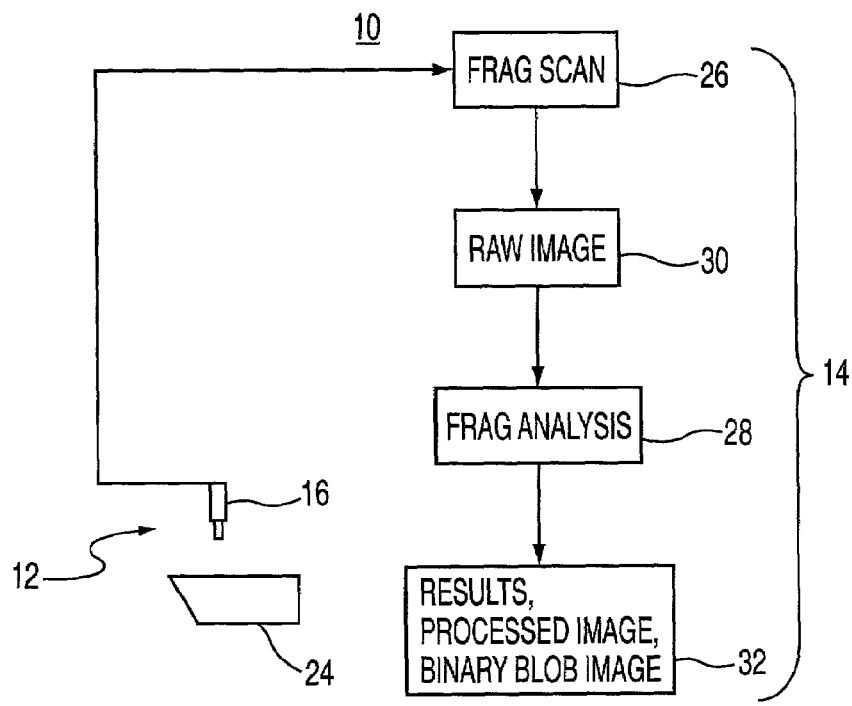
FIG. 1 is a schematic block diagram representation of an embodiment of a rock fragmentation analysis system of the invention.

Referring to FIG. 1, there is shown a schematic block diagram representation of an embodiment of a rock fragmentation analysis system of the invention. The invention is described herein in the context of analyzing rock scoops loaded on load haul dump (LHD) vehicles for removing blasted rock from within a mine tunnel. It is contemplated that the system of the invention may also be used in analyzing scoops of blasted rock obtained from other enclosed environments, such as a tunnel, cave, building, etc., or overhead (i.e., external) surface environments, such as a rocky terrain.

The rock fragmentation system designated generally by reference numeral 10 typically includes a hardware system 12 and an image processing system 14. The hardware system 12 includes at least one camera 16 and a lighting system 18 having a plurality of lighting fixtures 20 (see FIG. 2). The lighting fixtures 20 are preferably four 500-watt quartz-halogen flood lights. The camera 16 is set to view the top surface of the rock scoop. Preferably, the camera 16 is a CCD color video camera equipped with a wide angle lens that yields a 4.25 meter (14 ft) field of view at a distance of 2.43 meters (8 ft).

The lighting system 18 illuminates an area of the mine, quarry, etc. where a LHD vehicle 22 (see FIG. 3) passes through. Once the LHD vehicle 22 passes through the illuminated area, the camera 16 provides video signals of scoop-top view images of blasted rock within a bucket 24 (see FIG. 2) of the LHD vehicle 22 to the image processing system 14 via known communication means, such as hard-wired and wireless. It is preferable to set up the hardware system 12 at a location in the mine where the LHD vehicle speed and dust conditions are minimum for a capturing good quality video images.

Figure 2:
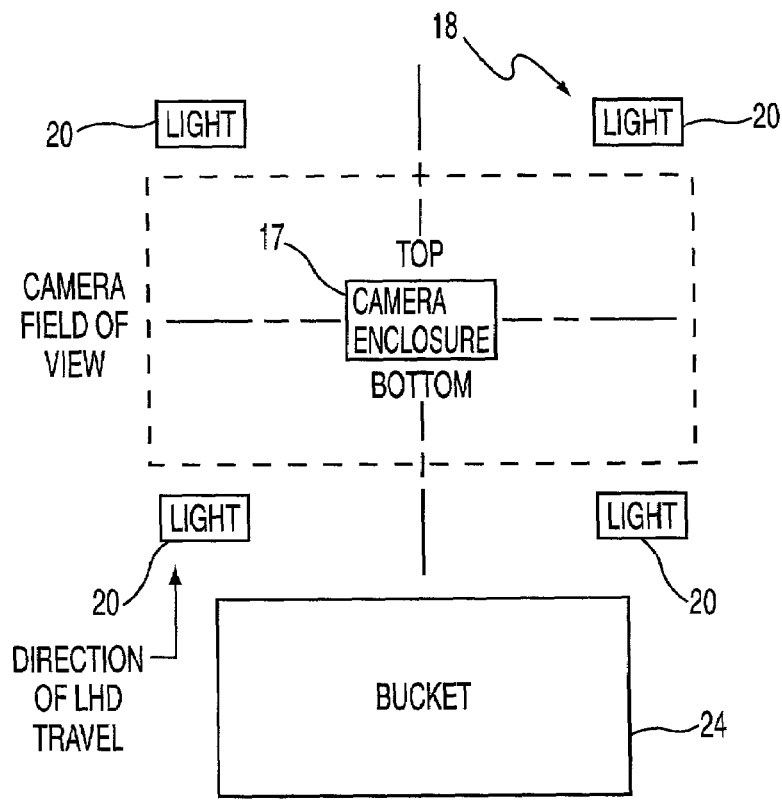
FIG. 2 is a schematic plan view representation of a mounting arrangement for a camera and a lighting system of the rock fragmentation analysis system of FIG. 1 for scanning a bucket of a load haul dump (LHD) vehicle.
Figure 3:
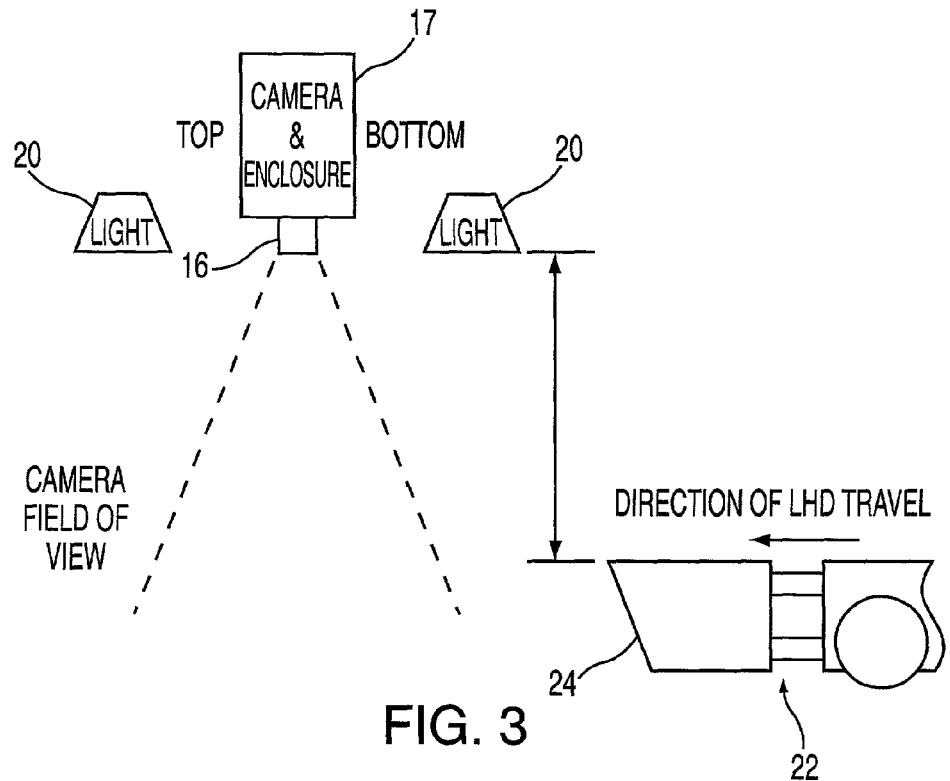
FIG. 3 is a schematic elevation view representation of the mounting arrangement for the camera and the lighting system of the rock fragmentation analysis system of FIG. 1.

With reference to FIGS. 2 and 3, there are shown plan and elevational views, respectively, of a preferred mounting arrangement for the camera 16 and the lighting fixtures 20 of the lighting system 18. The lighting fixtures 20 are located at the corners of a square 1.5 meters (5 feet) on each side. The camera 16 is located in the center of the square. The viewing window of a camera enclosure 17 which encloses the camera 16 is in the same horizontal plane as the lighting fixtures 20.

The distance between the top of the bucket 24 and the camera 16 should be a minimum of 2.4 meters (8 feet) in the vertical direction. The camera 16 is mounted along the centerline of the drift. The sides of the square defined by the lighting fixtures 20 are parallel to the edges of the bucket 24 as the bucket 24 travels beneath the camera 16. The long axis of the field of view of the camera 16 is perpendicular to the direction of travel of the LHD vehicle 22. This is achieved by having the bottom of the camera 16 face the direction of approach of the LHD vehicle 22 when the LHD vehicle 22 is mounted on the mine back.

The image processing system 14 is preferably a computer or a server having a central processing unit (CPU) which receives the video signals from the hardware system 12 via a communication channel, captures the multiple scoop-top view images, evaluates the images for subsequent fragmentation analysis, and performs the rock fragmentation analysis for generating a fragmentation distribution for each image, and/or a total fragmentation distribution based on two or more, e.g., all of the images, of the images of fragmented particles, i.e., muck piles, produced with blast specific conditions. The image processing system 14 performs these and other functions using several software modules having a set of instructions which are executed by one or more processors, such as the CPU, of the image processing system 14. Two such software modules are the Fragmentation Scanning (FragScan) 26 and the Fragmentation Analysis (FragAnalysis) 28 software modules.

Figure 4A:
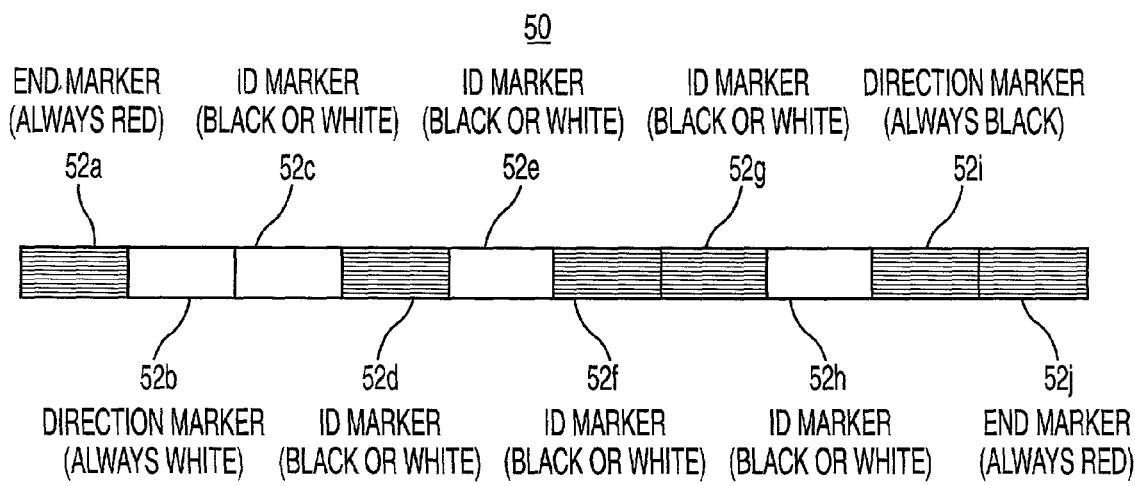
FIG. 4A is a schematic representation of a sample tag for attaching to a rock scoop of the LHD vehicle.

The FragScan software module 26 is preferably activated by an operator via a graphical user interface (GUI) for scanning the video signals until one or more valid images for analysis are captured by the image processing system 14. Once the FragScan software module 26 triggers on the image, a raw image 30 and other details corresponding to the captured image, such as an identifier value for identifying the rock scoop as described below with reference to FIG. 4A, are stored within an image database for subsequent analysis by the FragAnalysis software module 28. Portions of each raw image 30 may be edited to avoid taking into account background and foreground features, e.g., sky and ground, that might be interpreted by the image processing system 14 as fines, i.e., indistinguishable particles.

The FragScan software module 26 is further able to automatically detect a white rectangular scale from the raw image 30 to provide a length scale for automatic scaling during image analysis as described below. The length scale converts pixel data into length measurements. The FragScan software module 26 also allows one to use a user-defined fixed default value for scaling, rather than automatic scaling.

With reference to FIG. 4A, each LHD rock scoop is tagged using an identification tag 50 representing a bar code having a unique value to enable the FragScan software module 26 to identify the rock scoops as they travel via the LHD vehicles 22 through the camera's field of view. The tag 50 is also used by the FragScan software module 26 to determine the orientation of the LHD vehicle 22, i.e., to determine which end of the LHD vehicle 22 is the bucket-end with respect to an ore pass or a dump site. The information obtained from the tag 50 is encoded and stored within a file corresponding to the rock scoop image of the rock scoop for later identification and analysis by the FragAnalysis software module 28.

The location of the ore pass or the dump site relative to the camera 16 is specified in setup or initiation files within the image processing system 14. For example, if the dump site is above the camera's field of view a dump site orientation value in the FragScan software module 26 is set to one, and if it is below the camera's field of view, the dump site orientation value is set to two (see Table 1). The system 10 needs to know the dump site orientation value in order to determine if the rock scoop is on its way to or from the ore pass or the dump site. A LHD vehicle 22 approaching the ore pass or the dump site is assumed to have a full bucket of muck or rocks. Accordingly, the FragScan software module 26 is able to select an appropriate image of the vehicle's bucket 24 to send to the FragAnalysis software module 28.

Figure 4B:
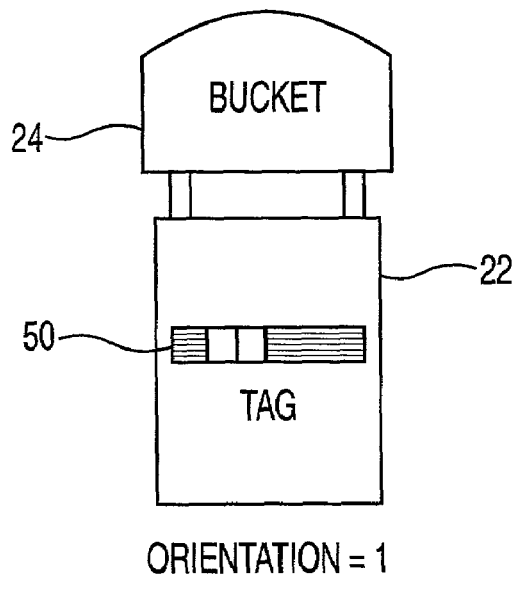
FIGS. 4B and 4C illustrate the orientation of the tag according to different directional paths of the LHD vehicle.
Figure 4C:
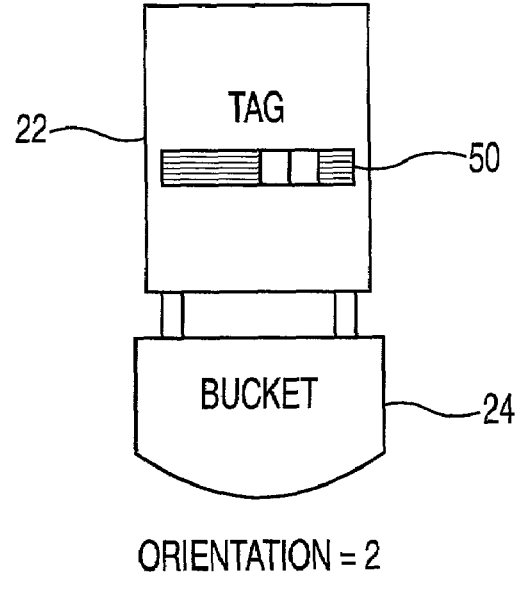

As shown by the exemplary tag of FIG. 4A, the tag 50 attached to each rock scoop includes a series of markers 52 that indicate various pieces of information to the FragScan software module 26. End markers 52a and 52j are red so they are quickly identified by image analysis algorithms of the image processing system 14. All of the other markers 52b–i are either black or white to indicate a bit value of either zero or one. The direction markers 52b, 52i are fixed, i.e., either black or white, for all tags 50 so that the direction in which the tag 50 can be read can be determined, in order to determine the orientation of the rock scoop. As shown by FIGS. 4B and 4C, the system 10 assigns a value of one or two for the rock scoop orientation value (see Table 1), based on the orientation of the white direction marker. For example, FIGS. 4B and 4C illustrate the orientation of the white direction marker on the left hand-side when facing the front of the LHD vehicle 22. ID markers 52c–h make up a binary number that is read with the least significant bit being the one adjacent to the start marker. In FIG. 4A, the tag 50 is a six bit number with a value of $2^0+2^2+2^5=37$.

A "trip wire" or scanning software module of the Frag-Scan software module 26 detects the entry and exit of an object, such as the LHD vehicle 22 and a maintenance worker, from the camera's field of view. The "trip wire"

software module takes two narrow bands of pixels at the top and bottom of the camera's field of view, and calculates the standard deviation of the intensity of the red channel pixels within the two narrow bands of pixels. The calculated standard deviation is then compared to a standard deviation of an image that is known not to have an object therein, e.g., a blank image. It has been demonstrated that if the standard deviation is greater than the standard deviation of the image that is known not to have an object therein, then an object has entered the camera's field of view.

The object that entered the camera's field of view could be one of the following:

1. An LHD vehicle 22 in forward gear entering from the top of the camera's field of view.
2. An LHD vehicle 22 in forward gear entering from the bottom of the camera's field of view.
3. An LHD vehicle 22 in reverse gear entering from the top of the camera's field of view.
4. An LHD vehicle 22 in reverse gear entering from the bottom of the camera's field of view.
5. Other (such as a maintenance worker).

If the top and bottom regions of the camera's field of view are designated as regions or masks A and B, then the order in which these regions are tripped indicates the direction of motion of the object; and if the object has an identification tag 50 on it, then one can determine the object's orientation as well. Whenever an object enters the camera's field of view, the first "trip wire" that it triggers is denoted as trip 1 and the second as trip 2. Therefore, the sequence of events is the following for an object entering the camera's field of view: (1) trip 1 is set; (2) trip 2 is set; (3) trip 1 is cleared; and (4) trip 2 is cleared.

An image is recorded by the camera 16 when trip 2 is set; the image is designated as the "forward" image. This is the image that will be passed to the FragAnalysis software module 28, if it is determined that the LHD vehicle 22 is moving forward, i.e., a path orientation value in the initiation file is assigned a value of one. An image is also recorded when trip 1 clears; the image is designated as the "reverse" image. This is the image that will be passed to the FragAnalysis software module 28, if it is determined that the LHD vehicle 22 is in reverse, i.e., the directional path orientation value in the initiation file is assigned a value of two (see Table 1). In either case, the unused image is discarded.

TABLE 1

Dump site, rock scoop, and directional path of LHD vehicle orientation values for determining condition of the LHD vehicle and action to be taken by the system of the invention.

| Dump Site Orientation | Rock Scoop Orientation | Directional Path Orientation | Condition | Action |
|---|---|---|---|---|
| 1 | 1 | 1 | Approaching dump site in forward gear--bucket should be full. | Process First image |
| 1 | 1 | 2 | Leaving dump site in reverse gear--bucket should be empty. | Do nothing |
| 1 | 2 | 1 | Approaching dump site in reverse gear--bucket should be full. | Process Second Image |
| 1 | 2 | 2 | Leaving dump site in forward gear--bucket should be empty. | Do nothing |
| 2 | 1 | 1 | Leaving dump site in forward gear--bucket should be empty. | Do nothing |
| 2 | 1 | 2 | Approaching dump site should be full. | Process Second Image |
| 2 | 2 | 1 | Leaving dump site in reverse gear--bucket should be empty. | Do nothing |
| 2 | 2 | 2 | Approaching dump site in forward gear--bucket should be full. | Process First Image |

Between the time trip 1 is set and trip 2 is cleared, the FragScan software module 26 looks for an identification tag 50 in the image. If a tag 50 is not found within a predetermined time-out period, the object that has entered the camera's field of view is assumed to be something other than a LHD vehicle 22.

If a tag 50 is found within the predetermined time-out period by emphasizing features on the video image that match the red markers of the tag 50, e.g., markers 52a and 52j of the tag 50 shown by FIG. 4A, by a Tag Pre-process software module of the FragScan software module 26, a Tag Position software module of the FragScan software module 26 then determines whether the video image contains a tag 50, and if so, the locations of its red markers. It is contemplated that only the portion of the video image where the tag 50 should be located is examined to speed up image processing of the video image.

The features on the video image that match the red markets are emphasized by the Pre-process software module by extracting the red and green channels from the video image; creating an error image by subtracting the green channel from the red channel, such that the bright areas of the error image are those with the strongest red component; calculating a histogram of the error image (which is grayscale) containing the number of pixels at each intensity level; and determining whether the number of pixels at the intensity level corresponding to the intensity level of pixels of the red markers is approximately equal to a predetermined number of pixels, i.e., the actual number of pixels which make up the red markers.

Figure 6:
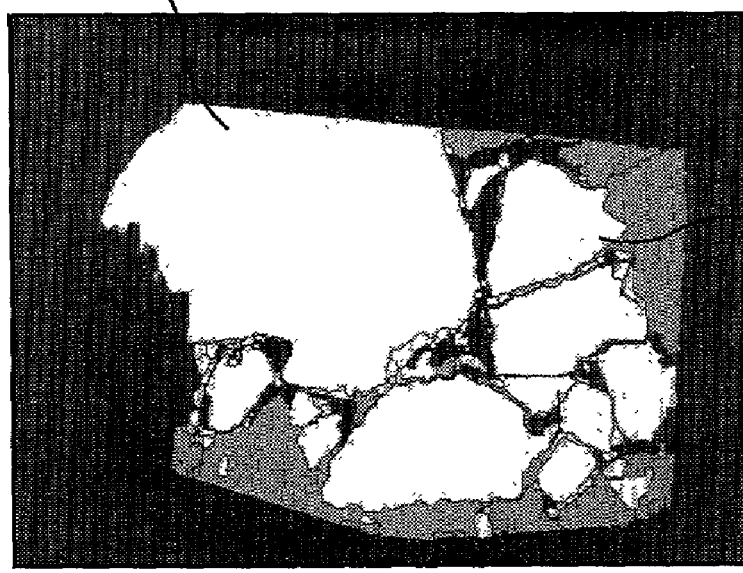
FIG. 6 is an associated image of the original image shown by FIG. 5 where the rock fragments have been segmented by the image processing system.

As mentioned above, the Tag Position software module of the FragScan software module 26 then determines if the video image contains a tag 50, and if so, the location of its red markers by calculating the areas, convex perimeters, and compactness of all the blobs in the processed video image (FIG. 6 illustrates a processed video image) using blob analysis routines as known in the art; excluding any blobs that fall outside predetermined limits as set in an initiation file; calculating the x and y coordinates of all remaining blobs; finding the pair of blobs whose separation distance is closest to that of the end markers; copying the x-y coordinates of the two blobs, i.e., x1, y1 coordinates of the first blob, and x2, y2 coordinates of the second blob, and outputting a bit having a value of one, i.e., the video image contains a tag 50, if a separation error of the two blobs is less than the maximum value specified in the initiation file; and otherwise, returning a bit having a value of zero, i.e., the video image does not contain a tag 50.

If a tag 50 is determined to be contained by the video image, a Tag Value software module of the FragScan software module 26 determines the value of the tag 50 by calculating the equation of a line passing through x1, y1 and x2, y2; dividing the line up into segments equal to the number of bits in the tag 50 as indicated in the initiation file; determining the mean value of the pixels at the end of each line segment, where the number of pixels used to calculate the mean value is determined by a marker radius parameter which indicates the radius or distance of each marker and is stored in the initiation file; determining the mean value and the distance or range of the first and last bits in the tag 50 which are either black and white, where if the distance is less than a set value, the image is assumed not to be a tag and an error is returned; and if the distance is greater than the set value, determining the tag orientation and value.

The FragAnalysis software module 28 is designed to retrieve saved raw images other information obtained by the FragScan software module 26 and perform a complete rock fragmentation analysis of the image upon opening the saved raw images via the GUI, and output results 32 (see FIG. 1). It is contemplated that the FragAnalysis software module 28 may be programmed to execute and terminate automatically without operator intervention.

The rock fragmentation analysis performed by the FragAnalysis software module 28 is designed to estimate the major diameter of each rock visible in the image. Preferably, the rock measurements, the overall size distribution of the rocks in the image, a name of the image, the time of scan, the LHD number, and camera number are output by the FragAnalysis software module 28 as one or more text files, and the corresponding input image as shown by FIG. 5 and designated generally by reference numeral 55, and the blob image, i.e., the processed image as shown by FIG. 6 and designated generally by reference numeral 60, are saved in a compressed format, such as in the jpeg format.

Figure 5:
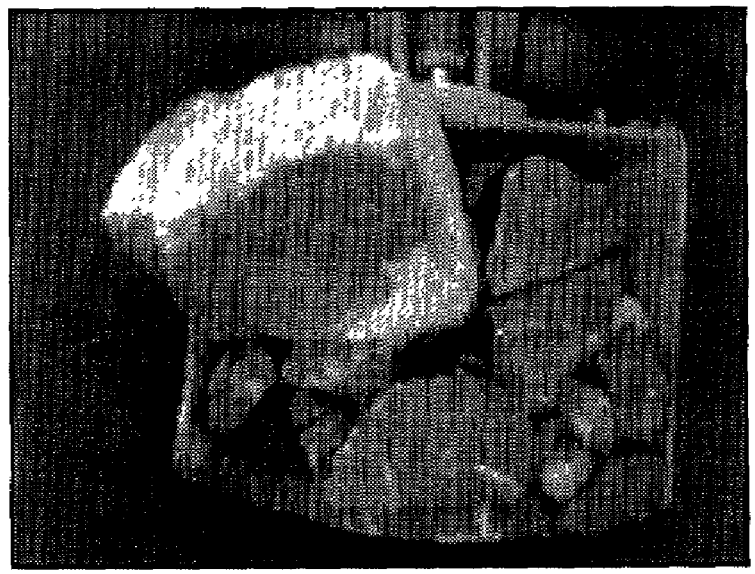
FIG. 5 is an original image showing rock fragments as captured by an image processing system of the rock fragmentation analysis system from a video feed.

Once the analysis is completed for a set of input images, i.e., a bucket image as shown by FIG. 5 and its background image, the input images are transferred to an output directory. The analysis then repeats, preferably automatically, for each set of input images found in an input directory.

In case of a fatal error, the analysis terminates and the time of occurrence of the fatal error is noted in a log file. In case of a functional error, the FragAnalysis software module 28 returns without further processing the set of input images. The two input images and the error file are then transferred to the output directory and analysis continues for a subsequent set of input images.

Once the FragAnalysis software module 28 is initiated, it automatically allocates all the memory buffers necessary for image processing and reads all pre-set or predetermined variables in the initiation file. The operator can change the pre-set variables using the GUI and save them in the initiation file for future use by the system 10. The system 10 deallocates all the buffers in case of a fatal error when executing the FragAnalysis software module 28.

Once the operator initiates rock fragmentation analysis, e.g., by clicking on a start soft button from a process menu in the GUI, the following functions are executed by an exemplary FragAnalysis software module 28.

1. All of the images having extensions *.tif, *.bmp and *.jpg are retrieved from the input directory and stored in a file array. The following image processing functions are performed for each image retrieved from the input directory.

2. Import the color image and split into three RGB (Red, Green and Blue) channels. Produce the intensity (gray scale) image.

3. Select a region of interest (ROI) window from the image by performing an ROI_Detection( ) function as described in detail below.

4. If auto-scaling option is enabled, then perform AutoScale( ) function as described in detail below to generate the conversion parameter length to pixel ratio (LPR). If auto-scaling is disabled, then read the default LPR value from the initiation file.

5. Perform a segmentation process for the ROI area of the image to generate a segmented gray scale (see FIG. 6) for fragmentation analysis. The processing is performed using two functions as follows:

BlobSeparation( ) function as described in detail below separates all brightly visible blobs in the image and stores the segmented blobs, such as blobs 62 and 64 in FIG. 6, in a separate image buffer.

EdgeSeparation( ) function as described in detail below determines the rock edges (boundaries) of rocks found in the non-segmented area during the BlobSeparation process. The blob image produced after BlobSeparation is then combined with the edge image produced after EdgeSeparation to produce the final Blob Image of the rock image. The Blob Image is save in a Blob Image file and includes three gray levels. Black represents the background, white represents the segmented blobs, and gray represents the fines (see FIG. 6).

6. Perform AnalysisResults( ) function as described in detail below to produce the major and minor diameters of each blob and the cumulative volume distribution of the blobs found in the Blob Image file to produce the fragmentation results which are written into the selected output directory.

7. If the process is stopped during processing, terminate the analysis execution, deallocate all buffers, and return to an idle condition. Otherwise, repeat steps 2 through 6 for the next image found in the input directory.

The FragAnalysis software module 28 further performs the BlobValidity( ) function to test whether the bucket image that has been taken for analysis from the input directory is a correct picture, i.e., test the validity of the captured bucket image. The inputs of the BlobValidity( ) function are the bucket intensity and green images, and the output is whether the bucket image is valid.

The following functions are performed by an exemplary BlobValidity( ) function:

1. Generate and edge image corresponding to the input bucket intensity image.

2. Calculate the average edge intensity value of the edge image.

3. If the average edge intensity value is less than the pre-set minimum edge value, return an error code for low contrast, i.e., invalid bucket image.

4. Extract green image of the RGB color image.

5. Using stochastic edge filter, generate a vertical edge image of the green channel.

6. Thin the edges to skeleton

7. Remove all short lines.

8. Mask top and bottom 60 rows of the edge image.

9. Find the longest 20 vertical lines after determining the vertical lines.

10. Count the number of pairs of parallel lines.

11. If the image contains two or more pairs of parallel lines, the function returns an error code indicating a non-bucket image.

12. If the image contains either one or no pairs of parallel lines, the image is returned to be a valid bucket image.

As indicated above, the FragAnalysis software module 28 performs the ROI_Detection( ) function which receives as inputs the bucket intensity image and the background intensity image and outputs the ROI image. The following functions are performed by an exemplary ROI_Detection( ) function:

1. First check whether the gray level bucket intensity image and gray level background intensity image are non-empty.

Figure 8:
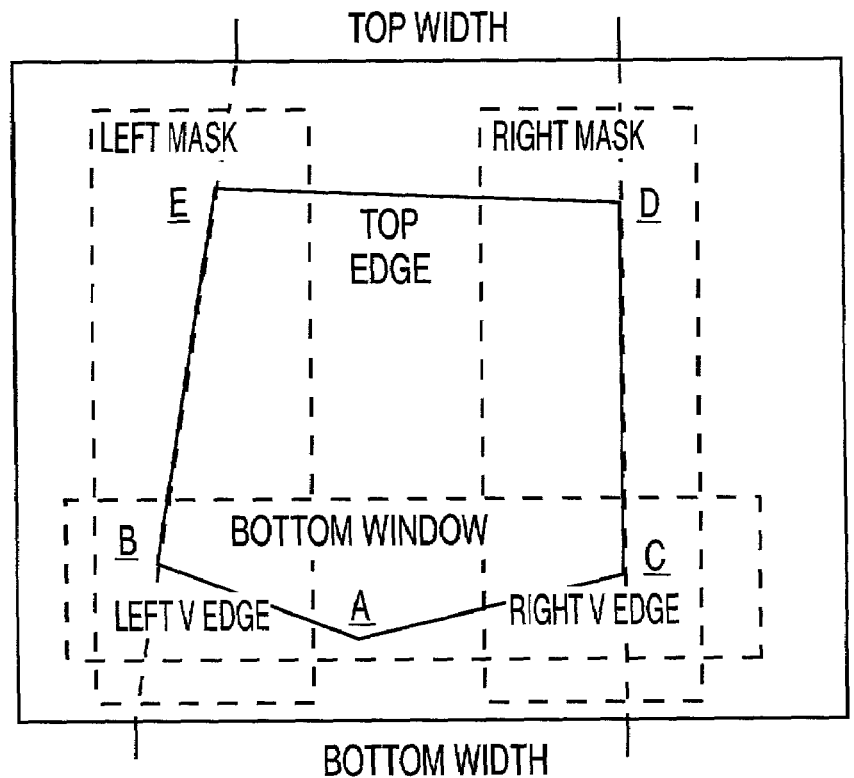
FIG. 8 shows the main features to be extracted from a bucket image to construct a region of interest (ROI) image.

2. Subtract the gray level background image from the gray level bucket image and obtain a subtracted image as shown by FIG. 8.

3. Obtain an edge image corresponding to the subtracted image.

4. Check the mean edge intensity. If the mean edge intensity is below a predetermined value, return an error code for invalid bucket image. Otherwise, proceed to the next step.

5. Find mean (Mean1) and standard deviation (Sigma2) of the left portion (designated left mask in FIG. 8) of the subtracted image (FIG. 8).

6. Find mean (Mean2) and standard deviation (Sigma2) of the right portion (designated right mask in FIG. 8) of the subtracted image.

7. Compute Mean=minimum(Mean1, Mean2) and Sigma=maximum(Sigma 1, Sigma2).

Search Left and Right Edges

8. Define a range for binarizing the subtracted image (FIG. 8) as threshold_lower_limit=maximum(10, Mean–Sigma) and threshold_upper_limit =Mean+20.

Begin a For-Loop:

9. Begin a for-loop for varying the binarizing threshold from threshold_lower_limit to threshold_upper_limit by steps of 10.

9.1 Binarize the subtracted image above the defined threshold and obtain a binary image.

9.2 Fill holes that exist in the blobs of the binary image.

9.3 Isolate all blobs having a width greater than a predetermined number of pixels, e.g., 100 pixels.

9.4 Isolate all blobs having Feret_Elongation greater than a predetermined value, e.g., five.

9.5 Delete all other narrow blobs.

9.6 Using a Laplacian filter, obtain the edge image.

9.7 Perform Hough transform for the left masked portion of the edge image and determine the best straight line. The Hough transform function returns the maximum pixel count, slope and intercept for the best line. Define CountLeft=pixel count.

9.8 Similarly perform Hough transform for the right masked portion of the edge image and determine the best straight line. Define CountRight=pixel count.

9.9 Compute top width and bottom width (see FIG. 8) corresponding to the above constructed two lines.

9.10 Reset a Flag=1.

9.11 Compare the two lines against Max_Width (default 470), Min_Width (default 300), Max_Total (default 800), Min_Total (default 695) and CountTh (default 100).

If (Top Width>Max_Width OR Top Width<Min_Width) OR

If (Bottom Width>Max_Width OR Bottom Width<Min_Width) OR

If (Top Width+Bottom Width>Max_Total OR Top Width+ Bottom Width<Min_Total) OR

If (CountLeft<CountTh OR CountRight<CountTh), then Flag=0.

9.13 If the test is successful (and Flag=1), return the coordinates of the two lines for ROI Image and go to step 17.

9.14 If the test is unsuccessful and Flag=0, then check the following conditions for an invalid image.

9.15 Check the image validity.

If (Flag=0) AND if (CountLeft>CountTh And CountRight>CountTh), break the loop and return the error code for an invalid bucket image and terminate the ROI_Detection. If not continue the for-loop.

9.16 Based on the maximum CountLeft and CountRight, retain the best Left and Right lines for sub-level testing.

9.17 If (Flag=0), then increment the Binarizing threshold by 10 units and continue the for-loop.

End of For-Loop.

10. If Flag=0, then use sub-level testing based on the best left and right lines detected in the above for-loop.

11. Recompute Top Width and Bottom Width based on the best detected left and right lines.

12. Reset Flag=1.

13. If (Top Width>Max_Width OR Top Width<Min_Width) OR

If (Bottom Width>Max—Width OR Bottom Width<Min_Width) OR

If (Top Width+Bottom Width>Max_Total OR Top Width+ Bottom Width<Min_Total), then Flag=0.

14. If the test is successful, return the two lines for ROI Image and go to step 17. If unsuccessful, proceed to the second level of line detection.

15. Instead of using subtracted image in step 5, use the bucket intensity image and repeat steps 5 through 14. If valid lines are detected and Flag=1, go to step 17. If unsuccessful, proceed to the next step.

16. If Flag=0, then select the best line detected in step 9 and estimate the second line keeping a distance equal to the average width of Max_Width and Min_Width and go to step 17.

17. Begin construction of ROI image by first making a blank white image. Then darken the areas outside of the two detected lines.

Obtain Accurate Left and Right Borders with over Flown Rock Boundaries

10. Binarize the subtracted image above a threshold equal to (Mean minus 10).

11. Extract all the blobs touching the two detected lines from the binarized image.

12. Extract the overflown blobs touching the two detected lines in the above binary image.

13. If the two lines have been estimated from step 16, then overlay all overflown blobs to the ROI image. Otherwise, delete all the blobs having compactness greater than a predetermined value, e.g., 2.5, and roughness greater than a predetermined value, e.g., 1.5.

14. Overlay (Binary OR) the selected overflown blobs to ROI image.

Construction of the Bottom Border

10. Select a rectangular window at the bottom portion of the subtracted image, as shown in FIG. 8.

11. Compute mean (Mean) and standard deviation (Sigma) of the pixel intensity within the selected window of the subtracted image.

12. Binarize the subtracted image above a threshold given by maximum (Mean minus Sigma+5, 10).

13. Darken the left and right areas of the binarized image from the detected left and right lines, respectively.

14. Further darken the top portion, i.e., a predetermined number of rows, e.g., 300 rows, in the image.

15. Invert the image to obtain a single blob that corresponds to the lower portion of the bucket image.

16. Remove any smaller blobs remained after inverting the image and keep the blob having Feret_X width greater than (bottom width minus 50).

17. Obtain an edge image to represent the bottom border.

18. Perform Hough transform on the above edge image twice to obtain Left V and Right V edge lines as shown in FIG. 8.

19. Fill all the holes above the two detected V lines.

20. Draw the two V lines on the existing ROI_Image and darken the area below the V lines.

21. Draw two V lines on the image and obtain all the blobs over-hanging from the two-bottom V edges.

22. If the over-hanging blobs have compactness less than a predetermined value, e.g., three, and roughness below a predetermined value, e.g., 1.2, overlay on the constructed ROI Image.

Construction of the Top Line

10. Obtain the coordinates of the intersecting points A, B and C as shown in FIG. 8.

11. Obtain the horizontal edge image corresponding to the intensity bucket image.

12. Select a window from the top area of the edge image.

13. Perform the Hough transform to obtain the top line.

14. Draw the obtained top line on the ROI_Image and darken the area above the top line.

15. Calculate distance between B and C and assign BC=Bucket_Front_Width.

16. Calculate width and height of the ROI_Image and assign to Bucket_Width=Feret_X and Bucket_Length=Feret_Y.

17. If Feret_Y<Min Width, then return the error code for an invalid image.

18. Otherwise return the ROI_Image for subsequent image processing.

As indicated above, the FragAnalysis software module 28 performs the BlobSeparation( ) function. Due to speckles and other rough textures of rock surfaces, an edge detection algorithm tends to produce fault edges which result in an disintegration of the rock surfaces in the blob image. As edge detection is based on neighborhood pixel intensity differences, the available algorithms are sensitive to high frequency noise and require image preprocessing for noise removal. The disintegration due to noise and sharp internal edges usually results in an underestimate of the rock sizes.

Alternatively, the gray image can be binarized to isolate brightly shown rock surfaces. Binarizing above a given threshold limit will automatically remove the effects of noise that are visible in the bright regions of the image. Binarizing has the disadvantage of isolating low intensity rock surfaces.

In most cases, the larger rocks appear brighter than small rocks and therefore the binarizing principle can be effectively used to isolate bigger blobs in the image. As binarizing is based on an intensity threshold, the binarizing method is unable to detect the dark or less bright rocks that are closely located with brightly visible rocks. Also, very small rocks that are clustered together are unable to separate from this function. Therefore, the BlobSeparation function, which has as inputs the gray scale bucket intensity image and the ROI_Image produced by the RIO_Detection function( ) and outputs a BigBlob_Image (i.e., a binary image), is designed to produce larger blobs and also to isolate brightly visible rocks in the image. The following functions are performed by an exemplary BlobSeparation( ) function:

1. Initialize size limits for blobs based on ROI dimensions.

2. Darken the outside area of the ROI in the bucket intensity image.

3. Calculate mean (Mean) and standard deviation (Sigma) of the bucket area.

4. Create Empty images for creating blob images and call them Blob_Image1, Blob_Image2 and Blob_Iimage3.

Progressive Delineation of Blobs

Begin a for-loop

5. Begin a for-loop by varying the threshold from Mean minus Sigma minus 15 to Mean+Sigma+15 in steps of 5.

5.1 Obtain a binary image of the bucket intensity image using the threshold step.

5.2 Mask-out the area outside the ROI.

5.3 Fill the dark patches having a size smaller than shadowsize1 (default is 60). Then, darken an area corresponding to the shadow area in the bucket intensity image and call it Binarized_Image1.

5.4 Fill the dark patches having a feret diameter smaller than shadowsize2 (default is 20). Then, darken an area corresponding to the shadow area in the bucket intensity image and call it Binarized_Image2.

5.5 Create three different watershed lines for three cases as follows:

Case a: Binarized_Image1 and set the minimum variation of the watershed to 2. Overlay the watershed lines on Binarized_Image1 and call it Blob1.

Case b: Use Binarized_Image1 and set the minimum variation of the watershed to 1. Overlay the watershed lines and Binarized_Image1 and call it Blob2.

Case c: Use Binarized_Image2 and set the minimum variation of the watershed to 1. Overlay the watershed lines on Binarized_Image2 and call it Blob3.

5.6 For each case in step 5.4 perform the following:

1. Keep the blobs satisfying all the conditions given below and delete the blobs where one or more of the conditions fail.

Compactness<Compactness_threshold (Default value is 2)

Roughness<Roughness_threshold (Default is 1.2)

Fraction of watershed lines on the perimeter<Fraction_threshold (Defaults: 0.45 for case a, 0.3 for case b, and 0.2 for case c).

2. Isolate blobs touching front and side edges of the bucket (i.e., borders in the ROI Image) for removing any bucket edge effects. Delete the blobs having edges falling 70% outside their X and Y dimensions.

5.7 Perform the following operations:

For case a, Blob1 OR Blob_Image1|Blob_Image1, for case b, Blob2 OR Blob_Image2|Blob_Image2, and for case c, Blob3 OR Blob_Image3|Blob Image3.

5.8 Increment Binarizing threshold and repeat step 5.

End of For-Loop.

1. Clean unwanted lines from all three blob images in the previous step.

2. Remove small blobs from all three Blob images (for Blob_Image1, the major diameter threshold limit is 20 and for other two blob images, the threshold limit is 50).

Making the Combined Big Blob Image from Three Blob Images

1. Consider each blob in Blob_Image3 and overlay on Blob_Image2, only if the overlap area of the blob in Blob_Image3 on separated blobs in Blob_Image2 is less than 85% of its area.
2. Reconstruct edges of the overlaid blobs.
3. Select all the blobs in the combined blob image and overlay them in Blob_Image1.
4. Reconstruct all edges of the overlaid blobs. Name the final blob image and BigBlob_Image.

Removal of Bucket Edge Effects

1. Consider BigBlob_Image and extract all the blobs touching top and bottom edge of the ROI_Image.
2. Leave all the blobs extending beyond the front edge of the bucket.
3. Delete blobs that are inline with bucket edges and update BigBlob_Image.
4. Again consider BigBlob_Image and extract blobs touching the side edges and top left and right corners of the ROI_Image.
5. Leave all the blobs that are extending beyond the side edges of the bucket.
6. Delete blobs that are inline with the bucket side edges.

As indicated above, the FragAnalysis software module 28 performs the EdgeSeparation( ) function. This function has two main parts. In the first part, it performs an edge detection algorithm to find all edges in the bucket image. With further image enhancements, a blob image is obtained. The unsegmented area is assumed to be fines in the bucket content. In the second part, the blob image obtained from the BlobSeparation( ) function is combined to produce the final blob image of the bucket content. The inputs of the EdgeSeparation function are the ROI_Image, the filtered RGB images of the bucket color image, and the BigBlob_Image and the output is a three gray level Blob_Image. The following functions are performed by an exemplary EdgeSeparation( ) function:

1. Define two edge thresholding values as threshold_low and threshold_high.
2. Set the edge threshold limits to a first set of values (defaults, threshold_low=20 and threshold_high=25).
3. Using the three RGB bucket images and the first set of edge thresholding values, perform an Edge_RGB( ) function as described in detail below. This function returns an edge image corresponding to the bucket image.
4. Using the ROI_Image, select the edges in the ROI region and call Edge_Image1.
5. Delete all open ended edge lines using a LineBlanking( ) function and save to a different image buffer.
6. Include blobs having compactness greater than a threshold value (default 2.5).
7. Copy Edge_Image1 to a temporary buffer and darken all the included blobs.
8. Extend the open-ended lines in the temporary buffer by 3 pixels.
9. Copy the included blobs to the temporary buffer and rename it as Edge_Image1.
10. Check occurrence of any unacceptable larger blobs.
11. Using blob-by-blob analysis, remove all the edges other than the main border of the blob.
12. Recalculate compactness and copy unsegmented area to a temporary buffer.
13. Perform watershed MIL operation on the unsegmented area in the temporary buffer.
14. Select watershed lines only if they occupy less than 30% of the perimeter of a given blob having a compactness less than the threshold compactness value.
15. Recalculate the compactness and copy segmented blobs back to Edge_Image1.
16. Extract blobs touching the edges of the ROI_Image.
17. Delete blobs that are aligned with bucket edges.
18. Copy the unsegmented area to Edge_Image1 and assign a gray scale 200.
19. Rename the image Blob1.
20. Assign the second edge threshold values (defaults, threshold_low=25 and threshold_high=30) and repeat steps 3 through 17 and rename the final image as Blob2.

Produce Final Edge-Based Image

1. Select all valid blobs from Blob2 and copy to a temporary buffer1.
2. Binarize Blob2 exactly at gray level 200 to obtain the unsegmented area image.
3. Obtain all valid blobs from Blob1 and copy to a temporary buffer2.
4. Obtain all blobs in temporary buffer2 that fall into the unsegmented area of Blob2.
5. Copy those blobs to temporary buffer1.
6. Again assign gray level 200 for the unsegmented area and copy to Edge_Image.

Combine BigBlob Image and Edge Image

1. Select all valid blobs from Edge_Image and copy to a temporary buffer.
2. Select blobs that have a major diameter greater than 80 from the Edge_Image.
3. Overlay the selected big blobs on BigBlob_Image only if a given selected blob does not overlap more than 85% of its area on the segmented blobs in the BigBlob_Image.
4. Reconstruct edges of the overlaid blobs and copy all blobs to the final Blob_Image.
5. Select an unsegmented region of the Blob_image from the Edge_Image.
6. Overlay the selected area back on Blob_Image.

The Edge_RGB( ) function performed by the FragAnalysis software module 28 uses three edge images produced from red, green and blue channels and returns an edge image for the EdgeSeparation( ) function. The following functions are performed by the Edge_RGB( ) function:

1. Using the filtered bucket red image, perform an function EdgeDetect( ) function as described in detail below. The output edge image is called EdgeR_Image.
2. Similarly using the bucket green and blue images, perform the function EdgeDetect( ) to obtain EdgeG_Image and EdgeB_Image.
3. Using an OR operation combine all three edge images and obtain a single image call Edge_Image.
4. Perform the thinning operation.
5. Obtain the shadow area from the bucket intensity image and overlay on the Edge_Image.

The Edge_Detect( ) function performed by the FragAnalysis software module 28 uses hysteresis thresholding. The function takes a filtered gray scale image and returns a binary edge image. The following functions are performed by the Edge_Detect( ) function:

1. Create four edge convolution masks to produce edges in four directions (zero, 45, 90 and 135 degrees).
2. Convolve each mask with a gray input image and produce four edge matrices, namely, Edge0, Edge45, Edge90 and Edge 135.
3. Create four empty image buffers for registering edges.

Perform Hysteresis Thresholding

Repeat the following steps 4 through 7 for each Edge matrix produced in step 3.

4. Binarize the edges having an intensity greater than threshold_high and copy them to four allocated empty buffers.

5. Delete all the edges having an intensity lower than the threshold_low from the edge matrix.

6. If an edge's pixel values lie between threshold_low and threshold_high, then check the neighborhood pixels connected in the edge direction. If the neighborhood pixels have any edges greater than threshold_high, binarize and copy to the corresponding edge image buffer.

Directional Thinning

7. Select the highest edge intensity perpendicular to the selected direction and delete all other pixels until the thickness of the edge becomes a single pixel wide.

8. Copy all the edges to a single image and return as the output binary edge image.

The AnalysisResults( ) function performed by the FragAnalysis software module 28 is the final function performed to produce the measurements of the rock sizes and their volume distribution. The function takes the Blob_Image produced from the EdgeSeparation( ) function. The white regions (pixel value 255) represents the segmented rock surfaces and gray scale (pixel value 200) represents the fines in the bucket 24. Dark pixels (pixel value 0) represent the background or dark shadows in the bucket image. All the sizes are preferably measured in centimeters.

Figure 7:
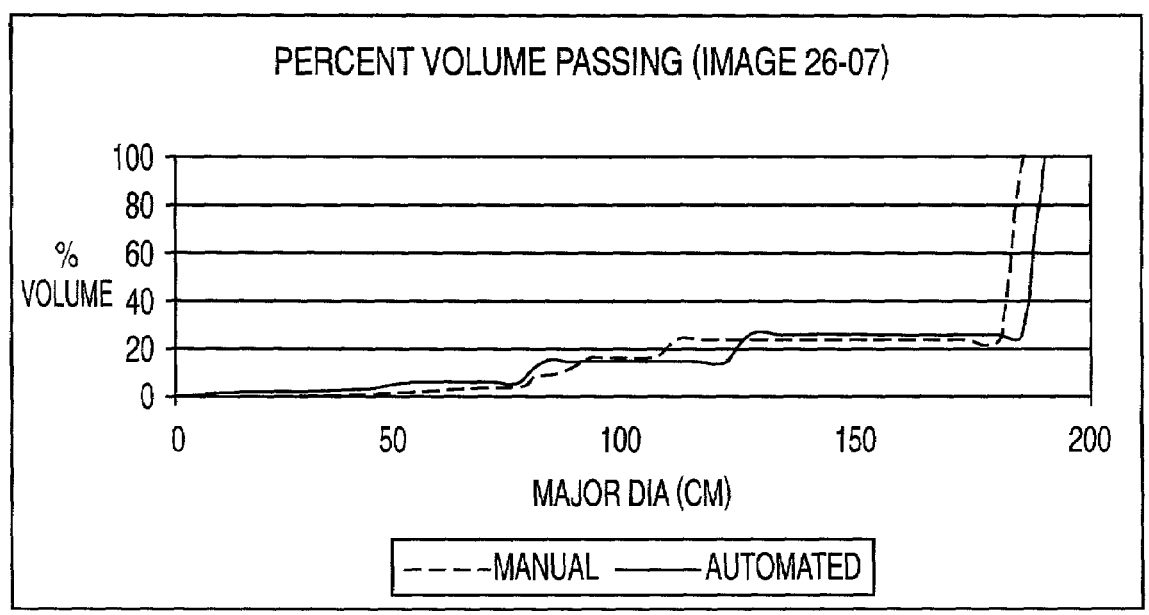
FIG. 7 is a chart showing the volume distribution curves calculated from manually tracing the rock fragments of FIG. 5 according to the prior art and from analyzing the segmented rock fragments according to the invention.

The inputs to the AnalysisResults( ) function are the Blob_Image, the Bucket_Front_Width_returned from the ROI_Detection( ) function, and the actual bucket width obtained from the initiation file. The outputs are the raw measurements of rocks in (cm), volume distribution (cubic cm) and percentage of passing versus major diameter of the rocks (e.g., as shown by FIG. 7) and the binary blob image.

The AnalysisResults( ) function uses the following assumptions:

a. For scaling assume the distance between bottom left and bottom right corners of the ROI_Image is equal to the actual width of the bucket 24.

b. For volume measurements assume the 3-D shape of a blob as ellipsoidal having the major and minor diameters respectively equal to the maximum and minimum feret diameters of the segmented blob.

c. For fines, assume the unsegmented area has a depth equal to the minimum feret diameter obtained from the blob analysis. If the minimum feret diameter is greater than the maximum depth (default 90 cm), then take the maximum depth.

d. Assume the volume of the total fines belong to the lowest size range in the volume distribution.

The following functions are performed by the AnalysisResults( ) function:

1. Calculate the LPR (length to pixel ratio) in cm/pixel. LPR=Bucket actual width/Bucket_Front_Width of the ROI_Image.

2. Take all the valid blobs (gray scale 255) from the Blob_Image and copy to a temporary buffer.

3. Perform blob calculations and produce feature arrays for maximum feret diameter, and minimum feret diameter.

4. Convert the diameters to cm using the LPR and assign them to different user arrays.

5. Assuming an ellipsoidal shape, produce an array for volume (volume=4.1888×major_diameter×minor_diameter$^2$).

6. Sort the blob sizes according to the major diameter and then write the major diameter and its corresponding minor diameter and volume to a text file.

7. Using a suitable step size (default is 5 cm) create several bins based on major diameter and assign them to a new user array.

8. Add all the numerical values of volumes in a given bin and then write to a volume distribution array.

9. Binarize the Blob_Image at the intensity equal to 200 for generating an image having fines.

10. Perform blob calculation on the fine image and produce features, minimum feret diameter and pixel area.

11. Using the LPR, convert above features to real units.

12. For each blob take the depth=minimum (90, minimum feret diameter in cm).

13. Calculate the volume of each blob by taking volume=area×depth.

14. Sum all the area values in the array and add them to the lowest bin in the volume distribution.

15. Based on the grand total of the volume distribution, produce the percentage volume distribution.

16. Write major diameter, volume distribution and percentage volume to a text file.

The FragAnalysis software module 28 further performs a Background_Validate_Image( ) function to check a received image from the FragScan software module 26 to determine if the received image is suitable for transformation into a background image. The Background_Validate_Image( ) function returns a boolean true variable if the image is suitable for a background image and a boolean false variable if the image is not suitable for a background image.

The Background_Validate_Image( ) function preferably receives a 640×480 RGB color image of a candidate image for a background image. The Background_Validate_Image( ) function converts the RGB image into HLS and then extracts out the hue channel. The sigma in the hue channel is computed for each of 16 horizontal bars (eight in the top ⅓ of the image and another eight in the bottom ⅓ of the image). The function then performs several checks on this data and determines if the image is suitable for a background image or not. Images which contain pieces of LHD or other equipment with a yellow color produce a reject condition.

To convert the RGB input image to a HLS image and extract out the hue channel the following functions are performed by an exemplary Background_Validate_Image( ) function:

1. Clear the mask image to all black.

2. Create white (solid, filled) rectangles on mask image which are full width (480 pixels) and 19 pixels in height and 1 pixel vertical separation between them. Create eight in the top ⅓ of the image starting from the y-coordinate position=8 and eight in the bottom ⅓ of the image starting at y-coordinate position=320. (The middle ⅓ of the image is ignored.)

3. Using the binary mask image and the hue channel, perform a blob analysis and compute the sigma for each rectangle. This should produce 16 results. (If this data is plotted on a graph, the ideal background image should produce a bell shaped curve. Any deviation from this curve is an indicator of an object in the image.)

4. Compute the average value for the entire data set.

5. Compute the average value of this data for the left, center and right portions of this graph. The left value is the average of the first four points, the center value is the average of the middle four points, and the right value is the average of the last four points.

6. Normalize the left, center and right averages via the center value.

7. Calculate the slope between the left and right average points. Slope=(avg_right minus avg_left)/12.

8. If the absolute value of the normalized left or right values exceeds the threshold (normally set to 1.1), then return false (not a suitable background image).

9. If the absolute value of the slope is greater than the threshold (normally 0.01) then return false (not a suitable background image).

10. If the average hue (computed in step 5) is greater than the threshold (normally set to 70), then return false (not a suitable background image).

11. If we reach this point, return true (a suitable background image).

The AutoScale( ) function is performed by the FragAnalysis software module 28 to locate two parallel side edges of a rectangular white scale positioned in the camera's image view. The pixel distance measured between the two parallel edges is used to obtain the conversion parameter LPR in cm/pixels. Accuracy up to a pixel is obtained when tracing the scale's edges. The straight scale edges are obtained by using the Hough transformation method. Hough transformation can be used to determine the best straight line passing through maximum number of non-zero pixels in a binary image.

Preferably the AutoScale( ) function is set to repeat a maximum of three times until a valid scale is found. During each cycle, the function searches for a valid scale. The function returns a predetermined value, e.g., 99999, when the AutoScale fails to find a valid scale.

An exemplary AutoScale( ) function performs the following functions:

AutoScale Preprocessing

1. Extract the saturation image channel from the HLS color input image. Compute the mean saturation intensity and its standard deviation.

2. Compute the Binarizing Threshold as follows: Mean+Standard deviation+threshold adjustment.

3. Using the threshold obtained binary saturation image, perform a blob analysis and remove the following blobs: remove all blobs having smaller diameters (e.g., less than 10 pixel); remove blobs if the height (ferret y diameter) or width (ferret×diameter) is greater than the maximum pixel limit; remove compacted blobs (e.g., below compactness 2); remove blobs having larger area (e.g., area greater than 2000); remove all blobs if they are connected to the ROI boundaries.

4. Store the cleaned image in a binary image buffer.

AutoScaleVerticalEdges

1. Find vertical edges of the cleaned binary image.
2. Delete edges having greater width than height.
3. Store the vertical edge image in an image buffer.
4. If the resultant edge image is empty and has no edges, then return a fail value, e.g., 99999.

AutoScaleHorizontalEdges

1. Find horizontal edges of the cleaned binary image.
2. Delete edges having greater height than width.
3. Store the horizontal edge image in an image buffer.
4. If the resultant edge image is empty and has no edges, then return a fail value, e.g., 99999.

AutoScaleVerticalTwoLines

1. Using Hough-transform determine the best fitting two vertical lines in the vertical edge image.

2. For each line, select the longest edge in the vertical edge image. Therefore, the final vertical edge image will have only two vertical edge segments corresponding to each vertical line and are expected to represent the two vertical sides of the scale.

3. Determine the centers of the two vertical edges.

4. Based on the maximum pixel limit determine, a bounding box isolating the two vertical edges.

5. Select all horizontal edges falling within the selected bounding box.

6. Perform the following test:
  6.1 The horizontal distance between the two centers of the two vertical edges is within a predetermined range of distance.
  6.2 The vertical distance between the two centers of the two vertical edges is within a predetermined tolerance.
  6.3 At least one horizontal edge should exist within the bounding box.

7. If the test is true then assign Boolean variables find_horizontal_scale "true" and find_vertical_scale "false".

8. If the test is false then assign find_horizontal_scale "false" and find_vertical_scale "true" and exit the function.

9. If find_horizontal_scale is true, then perform AutoScaleHoirzScale:
  9.1 Based on the bounding box, narrow the search space for two vertical lines. Then using the narrowed dimension recalculate the best two vertical straight lines. Store the coordinates of the two vertical lines to determine the scale.
  9.2 Select the horizontal edges falling within the two lines and also within the bounding box.
  9.3 Search for horizontal edges and if there are no edges found then assign find_horizontal_scale "false" and find_vertical_scale "true".
  9.4 If horizontal edges are found then perform the Hough transform and determine the best fitting horizontal line. Store the coordinates of the line.
  9.5 Calculate the coordinates of the intersecting points between horizontal line and two vertical lines.
  9.6 Obtain pixel distance between two intersecting points.
  9.7 Using the true length of the scale, determine the LPR (true distance in cm/pixel length).

10. If find_vertical scale is true, then perform AutoScaleHorizontalLines. This function performs the Hough transform to determine the best two horizontal lines from the horizontal edge image, similar to AutoScaleVertLines.
  10.1 For each line select the longest edge in the horizontal edge image. Therefore, the final horizontal edge image will have only two horizontal edge segments corresponding to each horizontal line and are expected to represent the two most horizontal sides of the scale.
  10.2 Determine the centers of the two horizontal edges.
  10.3 Based on the maximum pixel limit determine a bounding box isolating the two horizontal edges.
  10.4 Select all vertical edges falling within the selected bounding box.

11. Perform the following test:
  11.1 The vertical distance between the two centers of the two horizontal edges is within a predetermined range of distance.
  11.2 The horizontal distance between the two centers of the two horizontal edges is within a predetermined tolerance.
  11.3 At least one vertical edge should exist within the bounding box.

12. If the test fails return a fail value, e.g., 99999, for AutoScale fail.

AutoScaleVertScale

1. Based on the bounding box, narrow the search space for two horizontal lines. Then, using the narrowed dimensions in image recalculate the best two horizontal straight lines. Store the coordinates of the two horizontal lines to determine the scale.

2. Select the vertical edges falling within the two lines and also within the bounding box.

3. If there are no vertical edges found then return a fail value, e.g., 99999.

4. If vertical edges are found, then perform the Hough transform and determine the best fitting vertical line. Store the coordinates of the line.

5. Calculate the coordinates of the intersecting points between the vertical line and two horizontal lines.

6. Obtain pixel distance between two intersecting points.

7. Using the true length of the scale, determine the LPR (true distance in cm/pixel length).

FIG. 7 is a percentage-passing curve which shows the volume distribution calculated from the manual tracing of the rock fragments and the volume distribution calculated using the system 10 of the present invention. It is apparent that the system 10 provides results comparable to the manual procedure without requiring any labor intensive and time-consuming manual tasks.

The image processing system 14 generates an alarm to notify the operator of any problems or faults in the system 10, such as unacceptable rock distribution, failure to read the rock scoop identification tag, image brightness is below an acceptable threshold, the analysis cannot be performed for any reason, and the image is not available or cannot be found. The alarm may be in the form of an e-mail or a TCP/IP message sent by the rock fragmentation analysis system 10 to a remote PC. It is contemplated that the system 10 communicates the results of the analysis and reasons for the generation of an alarm to a central computer located in a remote location.

The rock fragmentation analysis system 10 of the invention is designed to operate on-line, i.e., while the mine, quarry, etc. is fully functional. Preferably, the two or more processors provided within the image processing system 14 distribute the processing load of the image processing system 14.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A system for performing fragmentation analysis, the system comprising:
   a camera configured for capturing a plurality of images of fragmented particles, wherein the plurality of images include at least two images for each group of fragmented particles;
   at least one processor for executing programmable instructions for generating at least one of a fragmentation distribution of the fragmented particles corresponding to at least one of the plurality of images, and a total fragmentation distribution of the fragmented particles corresponding to two or more of the plurality of images;
   means for determining an orientation and a direction of travel for each vehicle of a plurality of vehicles loaded with a respective group of fragmented particles; and
   means for identifying each of the plurality of vehicles.

2. The system according to claim 1, wherein the means for determining an orientation and a direction of travel includes at least one tag having a plurality of markers and mounted to each of the plurality of vehicles, and the means for identifying includes a subset of the plurality of markers providing a respective identification code for each of the plurality of vehicles.

3. The system according to claim 1, further comprising:
   means for scaling each of the plurality of images to locate side edges of a scale positioned in an image view of the camera; and
   means for measuring a pixel distance between the side edges to obtain a length to pixel ratio (LPR).

4. The system according to claim 3, wherein the means for scaling includes means for using a Hough transformation method to determine a straight line passing through a maximum number of non-zero pixels in a binary image corresponding to at least one of the plurality of images.

5. The system according to claim 1, wherein each of the plurality of images is a top view image of the fragmented particles.

6. The system according to claim 1, further comprising:
   means for detecting entry of an object within a field of view of the camera; and
   means for detecting exit of the object from within the camera's field of view.

7. The system according to claim 6, wherein the means for detecting entry of an object comprises:
   means for taking two bands of pixels from the top and bottom of the camera's field of view;
   means for calculating the standard deviation of the intensity of red channel pixels within the two bands;
   means for comparing the calculated standard deviation to a standard deviation of a blank image; and
   means for determining that the object has entered the camera's field of view if the calculated standard deviation is greater than the standard deviation of the blank image.

8. The system according to claim 6, further comprising means for determining whether the object detected as having entered the camera's field of view by the means for detecting entry is a vehicle.

9. The system according to claim 8, wherein the means for determining whether the object detected as having entered the camera's field of view is a vehicle comprises means for determining if an image representing the object within the camera's field of view contains an identification object by analyzing a binary image corresponding to the image.

10. The system according to claim 1, further comprising:
    means for determining a region of interest (ROI) window within each of the plurality of images;
    means for performing a segmentation process for the ROI window for generating a final blob image for each of the plurality of images; and
    means for determining the major and minor diameters of blobs in the blob image.

11. The system according to claim 10, wherein the means for performing a segmentation process comprises:
    means for separating blobs in a segmented gray scale image to produce a blob image;
    means for determining edges of the fragmented particles to produce a edge image; and means for combining the blob and edge images to produce the final blob image.

12. The system according to claim 10, wherein the at least one processor produces fragmentation results by using the major and minor diameters of blobs in the blob image corresponding to each of the plurality of images.

13. A method for performing fragmentation analysis, the method comprising the steps of:
capturing a plurality of images of fragmented particles, wherein the plurality of images include at least two images for each group of fragmented particles;
executing programmable instructions for generating at least one of a fragmentation distribution of the fragmented particles corresponding to at least one of the plurality of images, and a total fragmentation distribution of the fragmented particles corresponding to two or more of the plurality of images;
determining an orientation and a direction of travel for each vehicle of a plurality of vehicles loaded with a respective group of fragmented particles; and
identifying each of the plurality of vehicles.

14. The method according to claim 13, wherein the step of determining an orientation and a direction of travel includes the step of providing at least one tag having a plurality of markers to each of the plurality of vehicles, and the step of identifying each of the plurality of vehicles includes determining a respective identification code for each of the plurality of vehicles using a subset of the plurality of markers.

15. The method according to claim 13, further comprising the steps of:
scaling each of the plurality of images to locate side edges of a scale positioned in an image view of the camera; and
measuring a pixel distance between the side edges to obtain a length to pixel ratio (LPR).

16. The method according to claim 15, wherein the step of scaling includes the step of using a Hough transformation method to determine a straight line passing through a maximum number of non-zero pixels in a binary image corresponding to at least one of the plurality of images.

17. The method according to claim 13, wherein the step of capturing the plurality of images includes the step of providing a camera to capture top view images of the fragmented particles.

18. The method according to claim 13, further comprising the steps of:
detecting entry of an object within a field of view of a camera positioned for capturing the plurality of images; and
detecting exit of the object from within the camera's field of view.

19. The method according to claim 18, wherein the step of detecting entry of an object comprises the steps of:
taking two bands of pixels from the top and bottom of the camera's field of view;
calculating the standard deviation of the intensity of red channel pixels within the two bands;
comparing the calculated standard deviation to a standard deviation of a blank image; and
determining that the object has entered the camera's field of view if the calculated standard deviation is greater than the standard deviation of the blank image.

20. The method according to claim 18, further comprising the step of determining whether the object detected as having entered the camera's field of view is a vehicle.

21. The method according to claim 20, wherein the step of determining whether the object detected as having entered the camera's field of view is a vehicle comprises the step of determining if an image representing the object within the camera's field of view contains an identification object by analyzing a binary image corresponding to the image.

22. The method according to claim 13, further comprising the steps of:
determining a region of interest (ROI) window within each of the plurality of images;
performing a segmentation process for the ROI window for generating a final blob image for each of the plurality of images; and
determining the major and minor diameters of blobs in the blob image.

23. The method according to claim 22, wherein the means for performing a segmentation process comprises the steps of:
separating blobs in a segmented gray scale image to produce a blob image;
determining edges of the fragmented particles to produce a edge image; and
combining the blob and edge images to produce the final blob image.

24. The method according to claim 22, further comprising the step of producing fragmentation results by using the major and minor diameters of blobs in the blob image corresponding to each of the plurality of images.

* * * * *